US 11,455,737 B2

(12) United States Patent
Grossnickle et al.

(10) Patent No.: US 11,455,737 B2
(45) Date of Patent: Sep. 27, 2022

(54) MULTIPLE-SCALE DIGITAL IMAGE CORRELATION PATTERN AND MEASUREMENT

(71) Applicant: The Boeing Company, Chicago, IL (US)

(72) Inventors: James A. Grossnickle, Bellevue, WA (US); James E. Pillers, Seattle, WA (US); Kevin Earl McCrary, Graham, WA (US)

(73) Assignee: The Boeing Company, Chicago, IL (US)

( * ) Notice: Subject to any disclaimer, the term of this patent is extended or adjusted under 35 U.S.C. 154(b) by 1410 days.

(21) Appl. No.: 13/706,838

(22) Filed: Dec. 6, 2012

(65) Prior Publication Data
US 2014/0160279 A1 Jun. 12, 2014

(51) Int. Cl.
| G06T 7/32 | (2017.01) |
| G01B 11/16 | (2006.01) |
| G01N 3/06 | (2006.01) |
| H04N 7/18 | (2006.01) |

(52) U.S. Cl.
CPC ............... *G06T 7/32* (2017.01); *G01B 11/16* (2013.01); *G01B 11/165* (2013.01); *G01N 3/068* (2013.01); *H04N 7/18* (2013.01); *G01N 2203/0647* (2013.01)

(58) Field of Classification Search
CPC ......................... H04N 1/58; G01N 2203/0647
USPC ........................................................ 348/137
See application file for complete search history.

(56) References Cited

U.S. PATENT DOCUMENTS

| 4,600,666 | A | 7/1986 | Zink |
| 5,608,529 | A * | 3/1997 | Hori .................... G01B 11/2509 356/609 |
| 6,460,418 | B1 * | 10/2002 | Hiyoshi ................. G01B 11/16 356/35.5 |
| 6,480,655 | B1 | 11/2002 | Fisk et al. |
| 6,567,570 | B1 | 5/2003 | Steinle et al. |
| RE43,747 | E * | 10/2012 | Delean .......................... 382/276 |
| 8,600,147 | B2 * | 12/2013 | Iliopoulos ............ G01B 11/165 356/32 |
| 9,311,566 | B2 * | 4/2016 | Iliopoulos ............ G06K 9/6232 |

(Continued)

FOREIGN PATENT DOCUMENTS

| FR | 2835603 A1 | 8/2003 |
| JP | 2002340756 A | 11/2002 |

(Continued)

OTHER PUBLICATIONS

"Aramis Optical 3D Deformation Analysis," Trillion Quality Systems, copyright 2010, 12 Pages.

(Continued)

*Primary Examiner* — Helen Shibru
(74) *Attorney, Agent, or Firm* — Yee & Associates, P.C.

(57) ABSTRACT

A method and apparatus for digital image correlation. A camera system is used to obtain larger scale images of a larger scale dot pattern on a surface of a workpiece and smaller scale images of a smaller scale dot pattern on the surface of the same workpiece. The smaller scale dot pattern forms a larger dot in the larger scale dot pattern in the larger scale images. The larger scale images and the smaller scale images may be used to determine a measurement of the workpiece.

14 Claims, 4 Drawing Sheets

(56) References Cited

U.S. PATENT DOCUMENTS

| | | | |
|---|---|---|---|
| 2005/0200857 A1* | 9/2005 | Christ, Jr. | G01B 11/2509 356/601 |
| 2005/0201121 A1 | 9/2005 | Chen et al. | |
| 2006/0070452 A1 | 4/2006 | Bohlmann et al. | |
| 2007/0099389 A1 | 5/2007 | Rossi | |
| 2008/0031513 A1 | 2/2008 | Hart | |
| 2008/0075928 A1 | 3/2008 | Gunaratne et al. | |
| 2009/0141287 A1* | 6/2009 | Sato et al. | 356/610 |
| 2012/0009390 A1 | 1/2012 | Yang et al. | |
| 2012/0133920 A1 | 5/2012 | Skunes et al. | |
| 2013/0070074 A1 | 3/2013 | Won | |
| 2013/0202192 A1 | 8/2013 | Telfer et al. | |

FOREIGN PATENT DOCUMENTS

| | | |
|---|---|---|
| JP | 2003028614 A | 1/2003 |
| JP | 2004508711 A | 3/2004 |
| JP | 2008031702 A | 2/2008 |
| JP | 2009204468 A | 9/2009 |
| JP | 2011027526 A | 2/2011 |

OTHER PUBLICATIONS

Revilock, Jr. et al.,"Digital Image Correlation Utilized to Obtain Full-Field Strains of a Full-Scale Orbiter Composite Overwrapped Pressure Vessel During Stress Rupture Life Testing," NASA, Dec. 2007, 4 Pages, accessed Nov. 27, 2012 http://www.grc.nasa.gov/WWW/RT/2006/RX/RX69S-revilock.html.

"Principle of Digital Image Correlation," Correlated Solutions, Inc., copyright 2010, 5 Pages, accessed Nov. 27, 2012 www.correlatedsolutions.com/index.php/principle-of-digital-image-correlation.

"Vic-3d 2012," Correlated Solutions, Inc., copyright 2010, 3 Pages, accessed Nov. 27, 2012 www.correlatedsolutions.com/index.php/products/vic-3d-2012.

Extended European Search Report, dated Feb. 28, 2014, regarding Application No. EP13195867.0, 8 pages.

Japanese Patent Office Notice for Reasons of Rejection, dated Aug. 22, 2017, regarding Application No. 2013-244591, 9 pages.

State Intellectual Property Office of PRC Notification or Third Office Action, dated Apr. 21, 2017, regarding Application No. 201310652953.1, 33 pages.

Tanaka et al. "Development of a pattern to measure multiscale deformation and strain distribution via in situ FE-SEM observations" Nanotechnology, vol. 22, Dec. 31, 2011, pp. 1-5.

State Intellectual Property Office of China First Notification of Office Action and English translation, regarding Application No. 201310652953.1, dated Oct. 26, 2016, 27 pages.

State Intellectual Property Office of China First Notification of Office Action and English translation, regarding Application No. 201310652953.1, dated Mar. 1, 2016, 25 pages.

Office Action, dated Mar. 27, 2018, regarding U.S. Appl. No. 15/152,151, 35 pages.

State Intellectual Property Office of China Notification of Fifth Office Action and English translation, dated Apr. 28, 2018, regarding Application No. 201310652953.1, 33 pages.

Japanese Patent Office Notice for Reasons of Rejection and English translation, dated Apr. 3, 2018, regarding Application No. 2013 244591, 8 pages.

State Intellectual Property Office of PRC Notification of the Decision of Rejection and English Translation, dated Jul. 31, 2018, regarding Application No. 201310652953.1, 39 pages.

Gong et al., "Displacement Measurement by Grid Digital Image Correlation," Journal of Experimental Mechanics, vol. 15, No. 2, Jun. 2000, pp. 246-252.

Final Office Action, dated Oct. 15, 2018, regarding U.S. Appl. No. 15/152,151, 27 pages.

Japanese Patent Office Decision of Non-Acceptance of Amendments and Rejection with English Translation, dated Nov. 27, 2018, regarding Application No. 20130244591, 7 pages.

* cited by examiner

MULTIPLE-SCALE DIGITAL IMAGE CORRELATION PATTERN AND MEASUREMENT

BACKGROUND INFORMATION

1. Field

The present disclosure relates generally to digital image correlation and to patterns used for digital image correlation. More particularly, the present disclosure relates to patterns for digital image correlation at different scales of resolution and digital image correlation measurements using such patterns.

2. Background

Digital image correlation may be used to identify various characteristics of a workpiece of interest. For example, digital image correlation may be used to calculate displacement and strain in a workpiece in response applied stress on the workpiece.

Digital image correlation uses a pattern on a surface of the workpiece for pattern recognition between a baseline image of the workpiece and successive images of the workpiece. For example, the baseline image of the workpiece may be obtained before a stress is applied to the workpiece. The successive images of the workpiece may be obtained after a stress is applied to the workpiece.

For example, the pattern on the surface of the workpiece may be a pattern of dots applied on the surface of the workpiece. The pattern on the surface of the workpiece is captured in images of the surface of the workpiece obtained by a camera system.

The images of the surface of the workpiece may be broken up into blocks of picture elements, pixels, wherein each block of picture elements includes a portion of an image of the pattern on the surface of the workpiece. The pattern in these blocks of picture elements is found in the baseline image and successive images of the surface of the workpiece. The shapes of the blocks of picture elements may be determined from the portions of the pattern in the blocks of picture elements in the images. Changes of the shapes of the blocks of picture elements between images may be used to determine the displacement and strain on the workpiece in response to the applied stress.

It may be desirable to use digital image correlation to determine characteristics of a workpiece at different scales. For example, it may be desirable to determine the displacements and strains in a workpiece, in response to an applied stress, across a large portion of the surface of a workpiece as well as at a particular smaller area of interest on the surface of the workpiece. Currently, such calculations may be performed by first obtaining images of a larger scale pattern applied across the larger portion of the surface of the workpiece and using digital image correlation of such images to determine the displacements and strains across the large portion of the workpiece. The test then may be repeated by obtaining images of a smaller scale pattern applied at the smaller area of interest on the surface of the workpiece and using digital image correlation of such images to determine displacements and strains at the smaller area of interest on the workpiece.

Currently, using digital image correlation to determine characteristics of a workpiece at difference scales requires applying separate patterns on the workpiece at different scales and completely re-performing the test of the workpiece at different scales. Therefore, using digital image correlation to determine characteristics of a workpiece at different scales presents a technical problem.

Accordingly, it would be beneficial to have a method and apparatus that takes into account one or more of the issues discussed above as well as possibly other issues.

SUMMARY

An illustrative embodiment of the present disclosure provides a workpiece. A first plurality of dots on a surface of the workpiece form a first dot pattern. The first plurality of dots comprises a first dot. The first dot comprises a second plurality of dots forming a second dot pattern.

Another illustrative embodiment of the present disclosure provides a method for applying a multiple-scale dot pattern on a workpiece. A plurality of smaller dots are applied on a surface of the workpiece to form a smaller scale dot pattern. The plurality of smaller dots form a larger dot in a larger scale dot pattern on the surface. A plurality of larger dots are applied on the surface to form the larger scale dot pattern.

Another illustrative embodiment of the present disclosure provides a method for digital image correlation. A camera system is used to obtain larger scale images of a larger scale dot pattern on a surface of a workpiece. The camera system is also used to obtain smaller scale images of a smaller scale dot pattern on the surface of the workpiece. The smaller scale dot pattern forms a larger dot in the larger scale dot pattern in the larger scale images. The larger scale images and the smaller scale images are used to determine a measurement of the workpiece.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number," as used herein with reference to items, means one or more items. For example, "a number of different considerations" means one or more different considerations.

The different illustrative embodiments recognize and take into account that it may be desirable to perform digital image correlation to analyze the characteristics of a workpiece at various different scales. For example, it may be desirable to identify displacements and strains across the surface of a workpiece in response to a deformation of the workpiece while also being able to identify the displacements and strains across smaller features on the workpiece surface in response to deformation of the workpiece. Currently, determining the displacements and strains on the workpiece at different scales may require running separate tests with patterns of different scale applied across the surface of the workpiece. Further, a portion of the surface of the workpiece that is prepared for smaller scale measurement using digital image correlation is unusable for larger scale digital image correlation measurements.

In accordance with an illustrative embodiment, a dot pattern may be applied on the surface of a workpiece that allows both larger scale and smaller scale measurements to be made by digital image correlation on the same pattern at the same time. As depicted, a smaller scale dot pattern, necessary for smaller scale measurements, may form a dot in a larger scale dot pattern that may be used for larger scale measurements. At a distance, the smaller scale dot pattern may appear as a solid dot in the larger scale dot pattern. Thus, in accordance with an illustrative embodiment, images of both the larger scale dot pattern and the smaller scale dot pattern may be obtained at the same time during the test. Digital image correlation may be used to determine displacement and strain on the workpiece at multiple scales, using the larger scale and smaller scale images obtained during the test.

Figure 1:
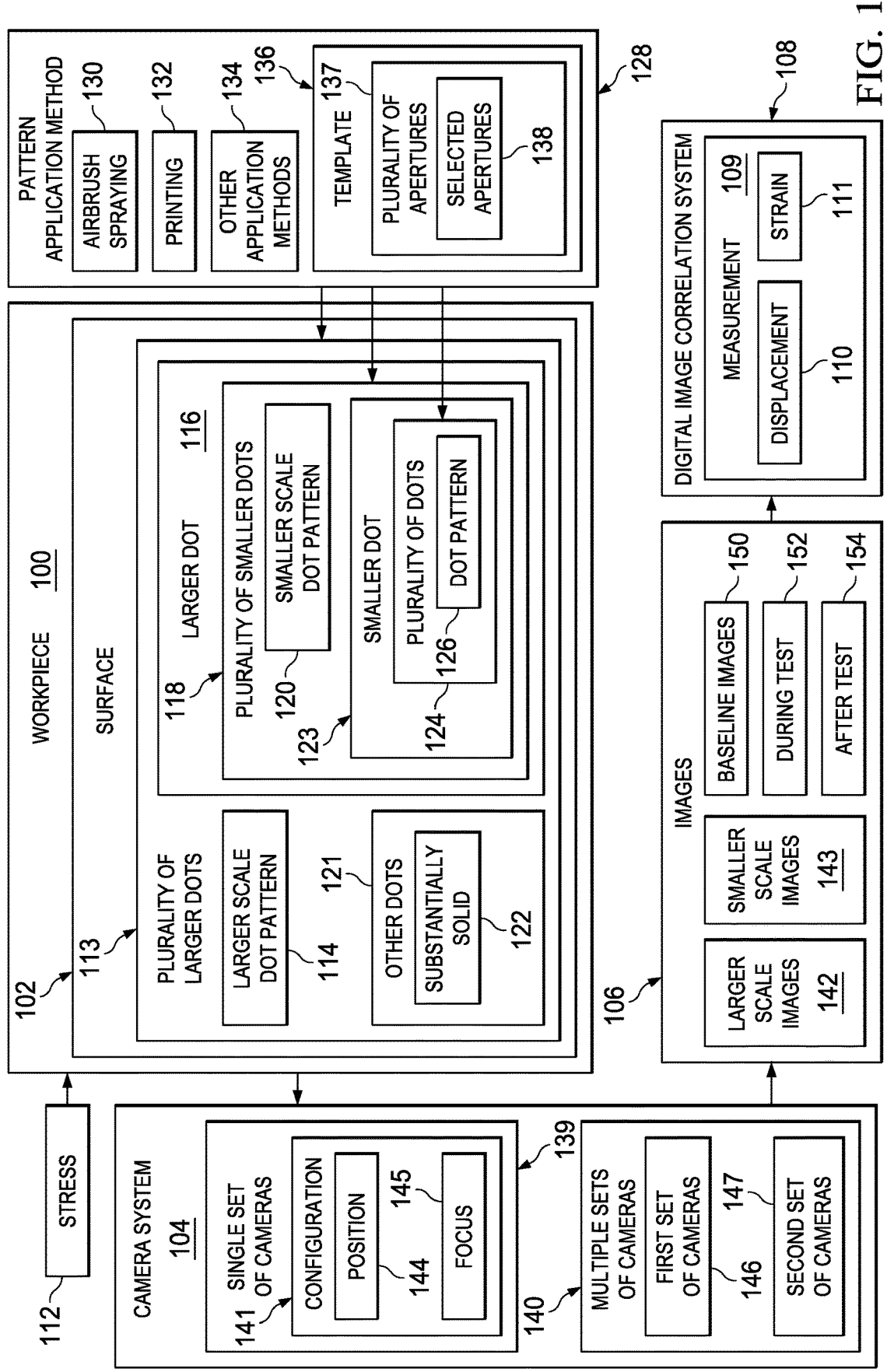
FIG. 1 is an illustration of a block diagram of a workpiece in accordance with an illustrative embodiment.

Turning now to FIG. 1, an illustration of a block diagram of a workpiece is depicted in accordance with an illustrative embodiment. In this example, workpiece 100 may be any object for which it is desirable to obtain any measurement using digital image correlation. Workpiece 100 may include any object made of any material.

In accordance with an illustrative embodiment, a dot pattern is applied on surface 102 of workpiece 100. Camera system 104 is used to obtain images 106 of the dot pattern on surface 102 of workpiece 100. Images 106 of workpiece 100 obtained by camera system 104 are provided to digital image correlation system 108 for processing. Digital image correlation system 108 may be configured to identify measurement 109 of workpiece 100 by digital image correlation of images 106 of workpiece 100. For example, without limitation, digital image correlation system 108 may be configured to use digital image correlation of images 106 of workpiece 100 taken at various points during a test to determine displacement 110 and strain 111 on workpiece 100 in response to stress 112 applied to workpiece 100.

In accordance with an illustrative embodiment, dot patterns over a range of multiple scales may be formed on surface 102 of workpiece 100. The multiple scale dot patterns may be applied over the same area on surface 102 of workpiece 100 in a manner so that dot patterns at smaller scales do not interfere with dot patterns at larger scales when images 106 of the dot patterns on surface 102 of workpiece 100 are used for digital image correlation. In accordance with an illustrative embodiment, smaller scale dot patterns may be formed in a manner such that the smaller scale dot patterns form dots in the larger scale dot patterns of which they are a part.

The dot pattern applied on surface 102 of workpiece 100 may include plurality of larger dots 113. Plurality of larger dots 113 may form larger scale dot pattern 114 on surface 102 of workpiece 100. For example, larger scale dot pattern 114 may be applied over a relatively large portion of surface 102 of workpiece 100.

Larger dot 116 may be one or more of plurality of larger dots 113 forming larger scale dot pattern 114. In accordance with an illustrative embodiment, larger dot 116 may be formed of plurality of smaller dots 118. Plurality of smaller dots 118 may form smaller scale dot pattern 120 on surface 102 of workpiece 100. Smaller scale dot pattern 120 may thus be formed on a relatively small portion of surface 102 of workpiece 100 within the relatively larger portion of surface 102 that includes larger scale dot pattern 114.

Plurality of larger dots 113 may include other dots 121 along with larger dot 116 to form larger scale dot pattern 114. Other dots 121 may or may not comprise plurality of smaller dots 118. For example, without limitation, other dots 121 may be substantially solid 122. In this application, including in the claims, a dot is considered substantially solid 122 if individual smaller dots cannot be distinguished within the dot for use in digital image correlation.

Smaller dot 123 may be one or more of plurality of smaller dots 118 forming smaller scale dot pattern 120. In accordance with an illustrative embodiment, smaller dot 122 may be formed of plurality of dots 124 forming dot pattern 126. In this example, dot pattern 126 may form a dot pattern that has a scale that is smaller than smaller scale dot pattern 120.

Plurality of larger dots 113, plurality of smaller dots 118, and plurality of dots 124 are examples of dots forming various dot patterns of various different scales on surface 102 of workpiece 100. The dots forming the various dot patterns on surface 102 of workpiece 100 may be of any appropriate shape. The dots forming the various dot patterns on surface 102 of workpiece 100 may have any appropriate color or shading with respect to surface 102 of workpiece 100 on which they are applied, as long as such dots are distinguishable from surface 102 in images 106 of surface 102 obtained at the appropriate scale by camera system 104. For example, without limitation, the various dots forming the various dot patterns on surface 102 of workpiece 100 may be formed as darker dots on a lighter background or as lighter dots on a darker background.

The dots forming the various dot patterns on surface 102 of workpiece 100 may be formed of any appropriate material. This material may be applied onto surface 102 of workpiece 100 to form the various dot patterns using any appropriate pattern application method 128. For example, without limitation, pattern application method 128 may include airbrush spraying 130, printing 132, other application methods 134, or any combination of application methods for applying an appropriate material onto surface 102 of workpiece 100 to form the various dot patterns.

Pattern application method 128 may be controlled in any appropriate manner to form dot patterns of various different scales on surface 102 of workpiece 100. For example, without limitation, pattern application method 128 may include the use of template 136 to form dot patterns of various scales at defined locations on surface 102 of workpiece 100. Template 136 may have plurality of apertures 137 formed therein. Plurality of apertures 137 in template 136 may define positions of plurality of larger dots 113 on surface 102 of workpiece 100 when template 136 is placed on surface 102. Plurality of smaller dots 118 may be formed in areas on surface 102 of workpiece 100 defined by a number of selected apertures 138 in plurality of apertures 137 to form smaller scale dot pattern 120 within larger scale dot pattern 114 on surface 102 of workpiece 100. Other dots 121 may be formed in areas defined by other ones of plurality of apertures 137 to form the rest of larger scale dot pattern 114 on surface 102.

Camera system 104 may be configured to obtain images 106 of the various dot patterns on surface 102 of workpiece 100 for use by digital image correlation system 108. For example, camera system 104 may be configured to obtain images 106 using various different fields of view corresponding to the various different scales of the dot patterns on surface 102 of workpiece 100. Any appropriate types of cameras for obtaining images 106 of surface 102 of workpiece 100 that may be appropriate for use by digital image correlation system 108 may be used to implement camera system 104. Camera system 104 may include single set of cameras 139 or multiple sets of cameras 140.

Single set of cameras 139 may include a number of cameras for obtaining images 106 of workpiece 100. For example, without limitation, single set of cameras 139 may include two cameras for obtaining images 106 of workpiece 100 in a manner so that three dimensional measurements of workpiece 100 may be made using images 106.

In accordance with an illustrative embodiment, configuration 141 of single set of cameras 139 may be changed to change the field of view of single set of cameras 139 to obtain images 106 of workpiece 100 at different scales corresponding to the various different scales of the dot patterns on surface 102 of workpiece 100. For example, single set of cameras 139 first may be configured to obtain larger scale images 142 of larger scale dot pattern 114 on surface 102 of workpiece 100. Configuration 141 of single set of cameras 139 then may be changed to change the field of view of single set of cameras 139 to obtain smaller scale images 143 of smaller scale dot pattern 120 on surface 102 of workpiece 100.

For example, without limitation, configuration 141 of single set of cameras 139 may include position 144 and focus 145 of single set of cameras 139. Position 144, focus 145, or both position 144 and focus 145 of single set of cameras 139 may be changed as appropriate to obtain images 106 of workpiece 100 at different scales corresponding to the various different scales of the dot patterns on surface 102 of workpiece 100.

In the case where camera system 104 includes multiple sets of cameras 140, separate sets of cameras may be used to obtain larger scale images 142 and smaller scale images 143. For example, without limitation, first set of cameras 146 may be used to obtain larger scale images 142 of larger scale dot pattern 114 on workpiece 100 while second set of cameras 147 simultaneously obtains smaller scale images 143 of smaller scale dot pattern 120 on workpiece 100.

In any case, camera system 104 may obtain images 106 of the various dot patterns of surface 102 of workpiece 100 before stress 112 is applied to workpiece 100. These images obtained before stress 112 is applied to workpiece 100 may be referred to as baseline images 150. Camera system 104 also may be used to obtain images 106 during test 152, while stress 112 is applied to workpiece 100. Camera system 104 also may be used to obtain images 106 after test 154, after stress 112 is removed from workpiece 100.

Larger scale images 142 and smaller scale images 143, including baseline images 150 and images obtained during test 152 and after test 154, may be provided to digital image correlation system 108. Digital image correlation system 108 may use any appropriate method for processing images 106 using digital image correlation to identify various characteristics of workpiece 100. For example, without limitation, digital image correlation system 108 may be implemented using commercially available digital image correlation software such as ARAMIS by TRILION Quality Systems/GOM or VIC-3D by Correlated Systems.

The illustration of FIG. 1 is not meant to imply physical or architectural limitations to the manner in which an illustrative embodiment may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 2:
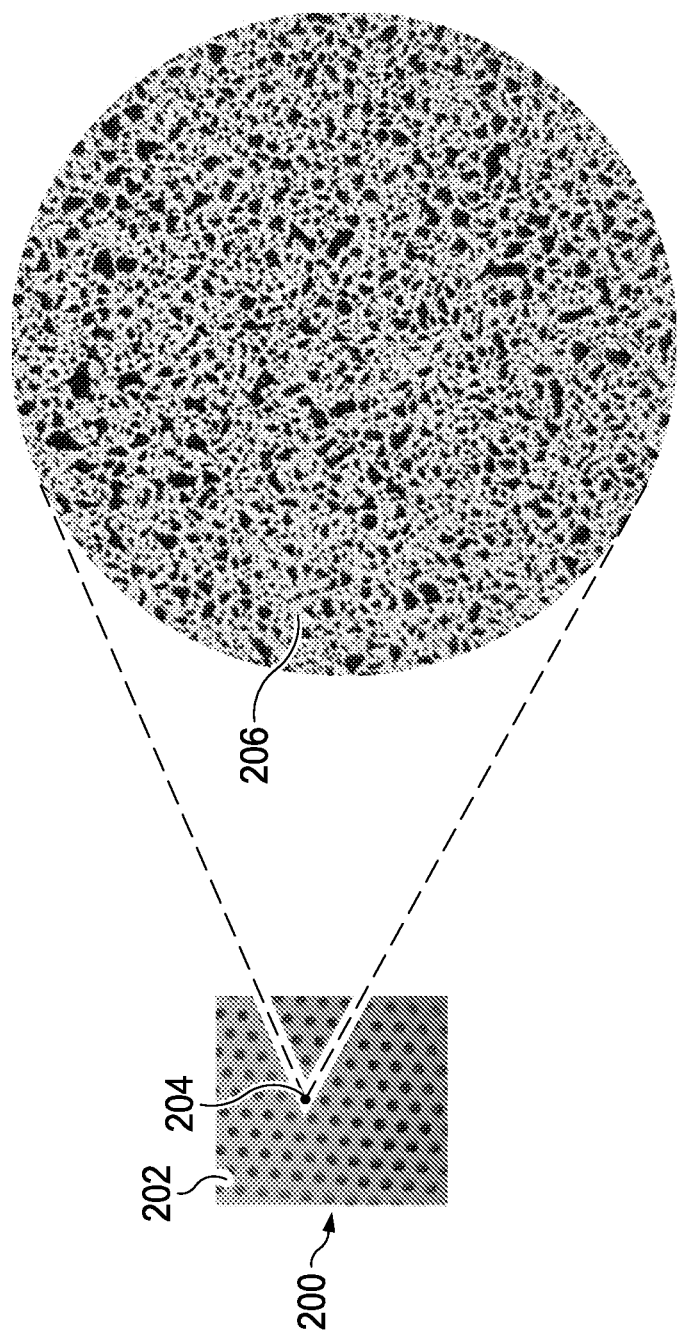
FIG. 2 is an illustration of a multiple-scale dot pattern on a workpiece in accordance with an illustrative embodiment.

Turning now to FIG. 2, an illustration of a multiple scale dot pattern on a workpiece is depicted in accordance with an illustrative embodiment. In this example, workpiece 200 may be an example of one implementation of 100 in FIG. 1.

Workpiece 200 may have larger scale dot pattern 202 formed thereon. Larger scale dot pattern 202 may include a plurality of larger dots formed on the surface of workpiece 200. For example, dot 204 may be one of the larger dots forming larger scale dot pattern 202.

An expanded view of dot 204 is shown on the right side of FIG. 2. As depicted, larger dot 204 itself is formed of smaller scale dot pattern 206. When viewed by a camera system with a smaller scale field of view, smaller scale dot pattern 206 forming larger dot 204 is apparent. However, in images of workpiece 200 obtained at a larger scale field of view at which larger scale dot pattern 202 becomes apparent, dot 204 that is larger appears to be one of the many dots forming larger scale dot pattern 202. Thus, the presence of smaller scale dot pattern 206 does not affect the use of larger scale dot pattern 202 for digital image correlation.

Figure 3:
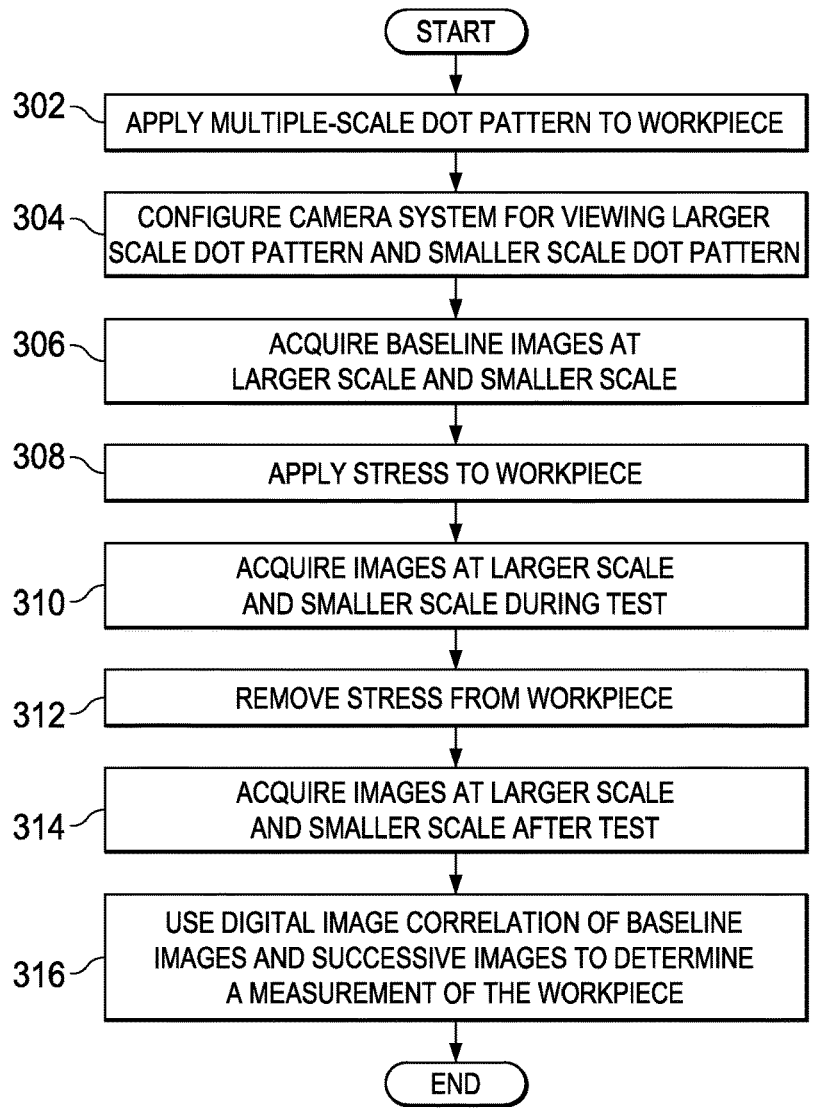
FIG. 3 is an illustration of a flowchart of a process for multiple-scale digital image correlation in accordance with an illustrative embodiment.

Turning now to FIG. 3, an illustration of a flowchart of a process for multiple-scale digital image correlation is depicted in accordance with an illustrative embodiment. For example, the process illustrated in FIG. 3 may be used for digital image correlation measurements of workpiece 100 in FIG. 1.

The process begins by applying multiple-scale dot patterns to a workpiece (operation 302). For example, operation 302 may include applying a smaller scale dot pattern to a surface of the workpiece in which the smaller scale dot pattern forms a larger scale dot in a smaller scale dot pattern applied to the surface of the workpiece.

A camera system then may be configured for viewing the larger scale dot pattern and the smaller scale dot pattern on the workpiece (operation 304). The camera system then may be used to acquire baseline images of the larger scale dot pattern at a larger scale and baseline images of the smaller scale dot pattern at a smaller scale (operation 306). Stress then may be applied to the workpiece (operation 308). Images of the larger scale dot pattern may be obtained at a larger scale and images of the smaller scale dot pattern on the workpiece may be obtained at a smaller scale during the test at which stress is applied to the workpiece (operation 310). The stress then may be removed from the workpiece (operation 312). Images of the larger scale dot pattern on the workpiece may be obtained and smaller scale images of the smaller scale dot pattern on the workpiece may be acquired after the stress is removed from the workpiece (operation 314).

Figure 4:
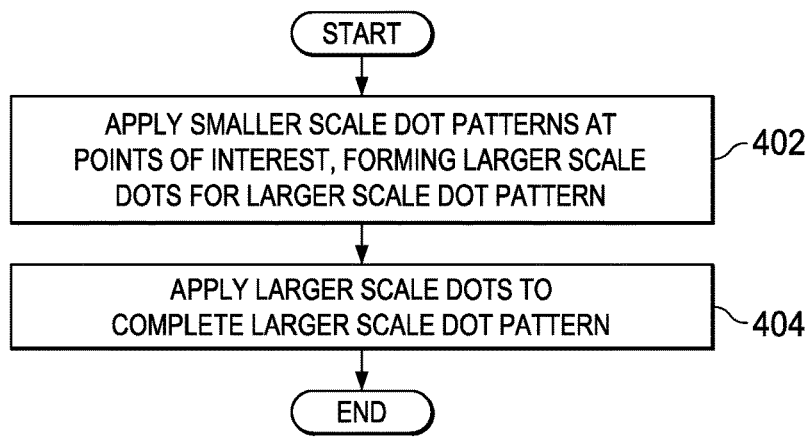
FIG. 4 is an illustration of a flowchart of a process for forming a multiple-scale dot pattern on a workpiece in accordance with an illustrative embodiment.

Digital image correlation of the baseline images and successive images then may be performed to determine a measurement of the workpiece (operation 316), with the process terminating thereafter. For example, without limitation, digital image correlation may be used to determine displacements and strains using the baseline images and the successive images of the larger scale dot pattern and of the smaller scale dot pattern on the workpiece Turning now to FIG. 4, an illustration of a flowchart of a process for forming a multiple-scale dot pattern on a workpiece is depicted in accordance with an illustrative embodiment. In this example, the process illustrated in FIG. 4 may be used to perform operation 302 in the process illustrated in FIG. 3.

The process begins by applying smaller scale dot patterns at points of interest on a workpiece such that the smaller scale dot patterns form larger scale dots for a larger scale dot pattern (operation 402). Additional larger scale dots then may be applied to the surface of the workpiece to complete the larger scale dot pattern (operation 404), with the process terminating thereafter.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 5:
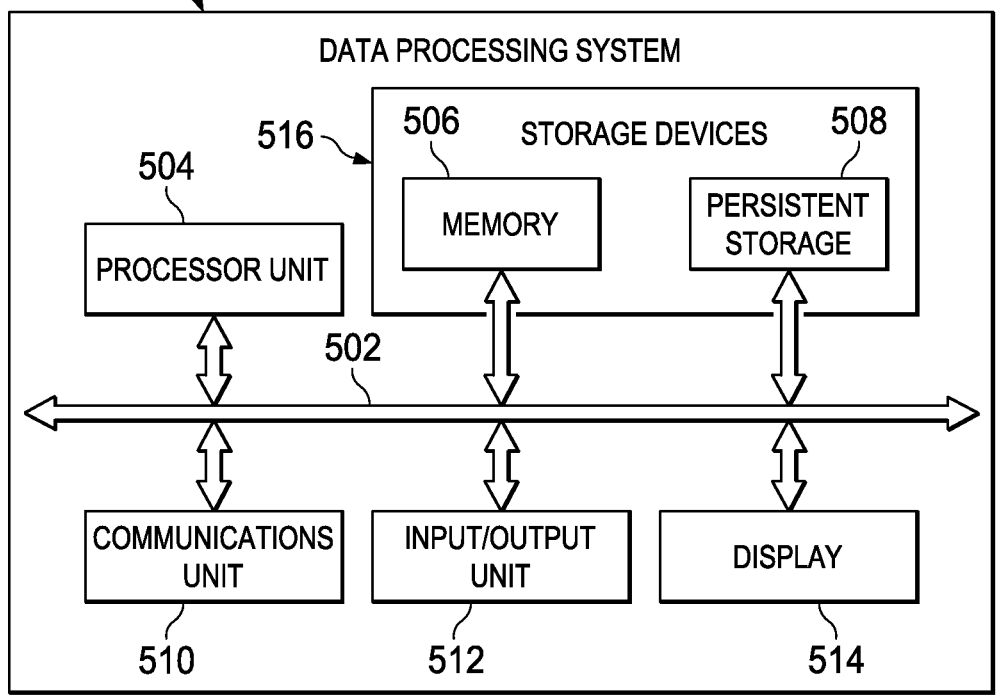
FIG. 5 is an illustration of a block diagram of a data processing system in accordance with an illustrative embodiment.

Turning now to FIG. 5, an illustration of a block diagram of a data processing system is depicted in accordance with an illustrative embodiment. In this example, data processing system 500 is an example of one implementation of a data processing system for implementing digital image correlation system 108 in FIG. 1.

In this illustrative example, data processing system 500 includes communications fabric 502. Communications fabric 502 provides communications between processor unit 504, memory 506, persistent storage 508, communications unit 510, input/output (I/O) unit 512, and display 514. Memory 506, persistent storage 508, communications unit 510, input/output (I/O) unit 512, and display 514 are examples of resources accessible by processor unit 504 via communications fabric 502.

Processor unit 504 serves to run instructions for software that may be loaded into memory 506. Processor unit 504 may be a number of processors, a multi-processor core, or some other type of processor, depending on the particular implementation. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and other suitable information either on a temporary basis or a permanent basis. Storage devices 516 also may be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output (I/O) unit 512 allows for input and output of data with other devices that may be connected to data processing system 500. For example, input/output (I/O) unit 512 may provide a connection for user input through a keyboard, a mouse, and/or some other suitable input device. Further, input/output (I/O) unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program instructions, program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is a media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to and/or in place of those illustrated for data processing system 500. Other components shown in FIG. 5 can be varied from the illustrative examples shown. The different embodiments may be implemented using any hardware device or system capable of running program code. As one example, data processing system 500 may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or both transmit and receive data. Communications unit 510 may be, for example, a modem or a network adapter, two network adapters, or some combination thereof. Further, a memory may be, for example, memory 506, or a cache, such as that found in an interface and memory controller hub that may be present in communications fabric 502.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system, comprising:
   a workpiece;
   a first plurality of dots disposed on a surface of the workpiece, wherein:
   the first plurality of dots forms a first dot pattern at a first scale;
   the first plurality of dots comprises a first dot; and
   the first dot comprises a second plurality of dots forming a second dot pattern at a second scale, the second scale smaller than and disposed within the first scale, the first plurality of dots and the second plurality of dots configured to provide a stress measurement for the workpiece;
a first set of cameras having a first field of view and a first focus, the first set of cameras configured for first imaging individual dots in the first plurality of dots at the first scale the first field of view disposed within the first dot pattern;
a second set of cameras having a second field of view and a second focus, the second set of cameras configured for second imaging individual dots in the second plurality of dots at the second scale, the second field of view smaller than the first field of view, the second field of view disposed within the second dot pattern, wherein first imaging and second imaging are configured to occur simultaneously; and
a digital image correlation system configured to analyze characteristics of the workpiece at the first scale and the second scale by digital image correlation of a first plurality of baseline images with a second plurality of successive images, wherein:
each of the first plurality of baseline images is simultaneously captured at both the first scale and the second scale;
each of the second plurality of successive images is simultaneously captured at both the first scale and the second scale; and
the digital image correlation between the first plurality of baseline images and the second plurality of successive images determines the stress measurement for the workpiece.

2. The system of claim 1, wherein:
positions of the first plurality of dots are defined by a template comprising a plurality of apertures; and
the second plurality of dots are formed in areas defined by a number of selected apertures in the plurality of apertures.

3. The system of claim 2, wherein the second plurality of dots are applied by airbrush spraying in the number of selected apertures.

4. The system of claim 1, wherein the second plurality of dots comprises a second dot and wherein the second dot comprises a third plurality of dots forming a third dot pattern.

5. A method, comprising:
obtaining, by a camera system, first scale images of a first scale dot pattern on a surface of a workpiece;
obtaining, by the camera system, second scale images of a second scale dot pattern on the surface of the workpiece, wherein:
each dot of the first scale dot pattern comprises smaller dots of the second scale dot pattern;
the second scale dot pattern is smaller than and disposed within the first scale dot pattern;
the camera system is comprised of a first set of cameras and a second set of cameras, the first set of cameras having a first field of view and a first focus corresponding to individual dots in the first scale dot pattern, the second set of cameras having a second field of view and a second focus corresponding to individual dots in the second scale dot pattern, the second field of view smaller than the first field of view, the second focus different than the first focus; and
obtaining the first scale images and obtaining the second scale images occurs simultaneously; and
determining a stress measurement for the workpiece by performing a digital image correlation between baseline images and successive images, wherein:
the baseline images comprise a first plurality of the first scale images and the second scale images;
the successive images comprise a second plurality of the first scale images and the second scale images;
the first plurality of the first scale images and the second scale images are different than the second plurality of the first scale images and the second scale images;
the baseline images are simultaneously captured at the first field of view and the second field of view; and
the successive images are simultaneously captured at the first field of view and the second field of view.

6. The method of claim 5, wherein:
the camera system comprises a first set of cameras configured to obtain the first scale images; and
the camera system comprises a second set of cameras configured to obtain the second scale images.

7. The method of claim 5, wherein:
the camera system comprises a single set of cameras configured to obtain the first scale images; and
further comprising changing a configuration of the single set of cameras to obtain the second scale images.

8. The method of claim 5, wherein the first scale dot pattern comprises a plurality of substantially solid dots at a first field of view larger than a second field of view at which individual ones of smaller dots of the second scale dot pattern are resolved.

9. The system of claim 1, wherein each of the first plurality of dots comprises a corresponding group of smaller dots relative to ones of the first plurality of dots, and wherein the second plurality of dots forming the second dot pattern is one of the corresponding group of smaller dots.

10. The system of claim 9, wherein the first plurality of dots is configured for use by a first camera system having a first field of view, wherein the each of the corresponding group of smaller dots are configured for use by a second camera system having a second field of view, and wherein the first field of view is larger than the second field of view.

11. The system of claim 10, wherein each of the first plurality of dots is composed of a corresponding second plurality of dots smaller than the first plurality of dots.

12. The system of claim 1, wherein first lateral extents of each of the plurality of second dots are disposed within second lateral extents of the first dot.

13. The method of claim 5, wherein:
the baseline images are simultaneously captured at the first focus and the second focus, respectively; and
the successive images are simultaneously captured at the first focus and the second focus, respectively.

14. The method of claim 13, wherein:
the baseline images are captured before the workpiece is subjected to stress; and
the successive images are captured after the workpiece is subjected to stress.

* * * * *